United States Patent
Knott et al.

(10) Patent No.: US 9,414,606 B2
(45) Date of Patent: Aug. 16, 2016

(54) CONE LINE AND CONVEYOR SYSTEM

(71) Applicant: D&F Equipment Sales, Inc., Crossville, AL (US)

(72) Inventors: Kenneth Richard Knott, Springdale, AR (US); Joseph William Knott, Gadsden, AL (US); Lucius Riley Eubanks, Jr., Albertville, AL (US)

(73) Assignee: D&F Equipment Sales, Inc., Crossville, AL (US)

( * ) Notice: Subject to any disclaimer, the term of this patent is extended or adjusted under 35 U.S.C. 154(b) by 0 days.

(21) Appl. No.: 14/486,071

(22) Filed: Sep. 15, 2014

(65) Prior Publication Data

US 2015/0079889 A1    Mar. 19, 2015

Related U.S. Application Data

(60) Provisional application No. 61/878,839, filed on Sep. 17, 2013.

(51) Int. Cl.
*A22C 21/00*    (2006.01)
*B65G 37/00*    (2006.01)

(52) U.S. Cl.
CPC .......... *A22C 21/0053* (2013.01); *B65G 37/005* (2013.01)

(58) Field of Classification Search
CPC ...... A22B 7/01; A22C 21/0053; A22C 21/06; A22C 15/02; A22C 25/08
USPC .................................. 452/177, 196, 197, 165
See application file for complete search history.

(56) References Cited

U.S. PATENT DOCUMENTS

| | | | | | |
|---|---|---|---|---|---|
| 4,385,419 | A | * | 5/1983 | Cantrell | 452/135 |
| 4,716,624 | A | * | 1/1988 | Massey, Jr. | 452/135 |
| 5,368,520 | A | * | 11/1994 | Koch et al. | 452/165 |
| 5,407,315 | A | * | 4/1995 | Suga | 414/564 |
| 5,492,503 | A | * | 2/1996 | Davis | 452/179 |
| 5,535,876 | A | * | 7/1996 | Fortenberry et al. | 198/803.12 |
| 6,283,847 | B1 | * | 9/2001 | Berry et al. | 452/136 |
| 6,688,461 | B1 | * | 2/2004 | Frazier et al. | 198/867.09 |
| 7,278,536 | B1 | * | 10/2007 | Harrison et al. | 198/867.09 |
| 7,303,059 | B2 | * | 12/2007 | Pugh | 198/448 |
| 7,467,996 | B1 | * | 12/2008 | Jager | 452/177 |
| 8,157,625 | B2 | * | 4/2012 | Hazenbroek | A22C 17/004 452/136 |
| 8,231,443 | B1 | * | 7/2012 | Tomcak | A22B 5/0052 452/135 |

* cited by examiner

*Primary Examiner* — Richard Price, Jr.
(74) *Attorney, Agent, or Firm* — The Webb Law Firm (57) ABSTRACT

A conveyor system is disclosed wherein the conveyor line includes two or more conveyor lines wherein all of the conveyor lines are built on a common frame. By building the conveyor lines on a common frame, the conveyor lines can be built adjacent to one another and share common sidewalls, eliminating gaps of traditional conveyor systems. Adjustable standing platforms can also be added to assist workers in reaching the conveyor lines. The result is a more modular, easier to clean, ergonomically beneficial conveyor system.

18 Claims, 13 Drawing Sheets

CONE LINE AND CONVEYOR SYSTEM

CROSS REFERENCE TO RELATED APPLICATIONS

This application is based upon U.S. Provisional Patent Application Ser. No. 61/878,839 entitled "Cone Line and Conveyor System", filed Sep. 17, 2013, which is hereby incorporated by reference in its entirety.

BACKGROUND OF THE INVENTION

1. Field of the Invention

The present invention relates generally to conveyor systems. In particular, the present invention relates to a cone line and conveyor system for poultry processing, and a method for using the cone line and conveyor system.

2. Description of Related Art

Presently, in the food processing industry, many meats are processed on an assembly line where workers place the animal to be processed on a conveyor system and workers downstream cut the meat from the bones. The meat is then processed or packaged for human consumption. To increase efficiency, multiple conveyors are used to convey the separate pieces of meat. In this way, once a cut of meat is removed from the bone, that meat can be placed on a conveyor belt, and, as other cuts are made, those pieces of meat can be placed on other conveyor belts. This allows the processing facility to separate out the different types and cuts of meat without a manual downstream separation process.

Currently, such as in poultry processing, different frames are built to accommodate the different conveyors. This can be bulky and cumbersome to do, particularly with how large and heavy the equipment can be. Because of the difficulty in lining up the different conveyors side by side, large tolerances are allowed in the manufacturing process. For example, if the inner conveyor is built larger than specified, as can happen in a manufacturing process, and the outermost conveyor is built smaller than specified, the conveyors may not fit together if the gap between the two conveyors is too small. Therefore, the conveyors are typically placed approximately 3.5 inches apart to accommodate such manufacturing tolerances.

However, such spacing between conveyors has significant limitations to the efficiency and cleanliness of the process. Particularly in the food processing industry, cleanliness is very important. A contamination of food can lead to an entire batch or order being discarded or recalled. Additionally, if any of the processed meat falls through the gap and touches the floor, that meat must be discarded because it has come in contact with the floor.

The spacing can also be difficult for workers, as the workers need to reach across the gap to perform their job function. Reaching a few inches farther can be straining when such reaching is performed continuously throughout the work shift. Additionally, extra conveyors can be added to systems, and each new conveyor will add another 3.5 inches in gaps. If four or five conveyors are used, this could result in the workers reaching an extra 14 to 17.5 inches.

Minimizing the gaps contributes to minimizing food waste, as smaller gaps will prevent the larger, more valuable items from falling through and coming in contact with the floor. However, it becomes a trade-off because smaller gaps make cleaning more difficult. Smaller gaps require smaller, more precise cleaning tools. The only way to improve the cleaning process is to eliminate the gaps completely.

Another limitation of using individually built conveyor lines is that it can be difficult to move items on one conveyor line over or under a second conveyor line. In traditional processing lines built with metal tubing, if one of the conveyor lines is to cross the other, there must be a gap in the tubing. Additionally, when one conveyor must cross over the other, the conveyors must be built at different elevations or one of the conveyors must increase in elevation where they are to cross. This further exacerbates worker fatigue, as workers transferring items between the conveyor lines must reach up or down between the two, needlessly increasing the workers range of motion.

Accordingly, such prior art processing systems are inefficient, difficult to clean, and/or not ergonomically conducive for workers.

SUMMARY OF THE INVENTION

Generally, it is an object of the present invention to provide a conveyor system that overcomes some or all of the above-described deficiencies of the prior art.

According to one preferred and non-limiting embodiment, provided is a conveyor system which includes a frame; a first conveyor line adapted for securing poultry and supported by the frame; and a second conveyor line supported by the frame and positioned directly adjacent to the first conveyor line such that the first and second conveyors share a common sidewall. The first conveyor line can include at least one upright member having a first end connected to the first conveyor line and a second end opposite the first end, the upright member being adapted for securing poultry. The first conveyor line can further be made of a plurality of connectible plates, wherein at least one of the connectible plates is adapted to threadably engage with the first end of the at least one upright member. The second conveyor line can be an endless belt made of a plurality of plastic links. The second conveyor line can also pass through an aperture in a plate in the frame and traverse the first conveyor line underneath the first conveyor line. The conveyor system of claim 1, wherein the frame comprises a plurality of modular sections which can be connected to build the frame.

An alternative, but non-limiting embodiment, involves a conveyor system that includes a frame having a lower portion and an upper portion, whereby the upper portion and lower portion are separated by a midline; at least one standing platform connected to the lower portion of the frame; and a plurality of conveyor lines supported by the upper portion of the frame. The at least one standing platform can be raised or lowered, and the at least one standing platform can be raised or lowered by fitting the at least one standing portion with a bracket containing a rod, wherein the rod is capable of mating with at least one notch in at least one plate attached to the frame.

An alternative, but non-limiting embodiment, involves a conveyor system having a frame; a plurality of conveyor lines located adjacent to one another and connected by the frame; wherein at least one of the conveyor lines is adapted for securing poultry; and wherein at least two of the conveyor lines share a common sidewall. The plurality of conveyor lines can include at least two conveyor lines of varying lengths. Further, at least one conveyor line can pass through the frame and underneath at least another conveyor line. The frame can also include a plurality of modular sections which can be connected to build the frame. An additional conveyor line can thus be built on a secondary frame.

Also disclosed is a method for using a conveyor system which includes operating a first conveyor line and a second conveyor line simultaneously, wherein the first conveyor line and second conveyor line share a common sidewall; placing poultry on the first conveyor line; and processing the poultry according to a manufacturing process.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE INVENTION

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

According to a preferred and non-limiting embodiment of the present invention, a conveyor system with two conveyor belts is used to assist in the manufacturing process by increasing product yield, efficiency, and workplace ergonomics. The system is designed with a first conveyor line, whereby the items to be manufactured or processed are placed for downstream processing, and a second conveyor line runs the length of the first conveyor line.

Figure 1:
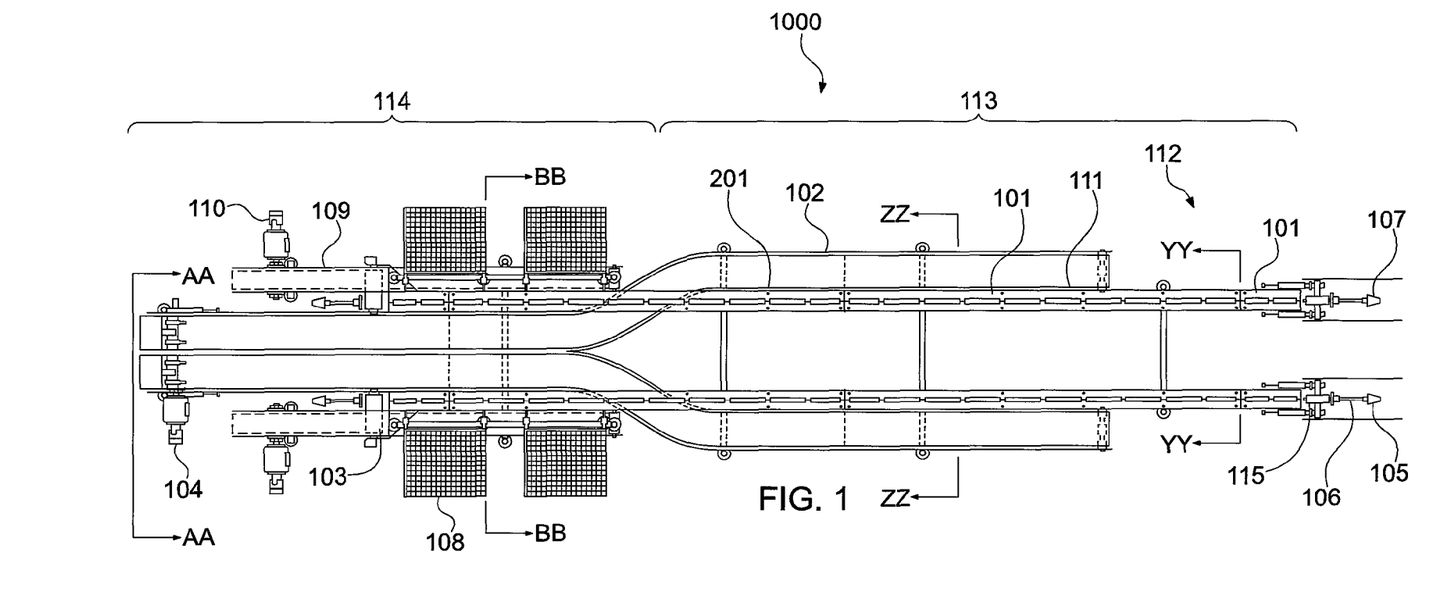
FIG. 1 is a top view of the conveyor system.

Referring now to FIG. 1, a conveyor system 1000 is shown according to a preferred and non-limiting embodiment of the present invention. Workers move items from the first conveyor line 101 to the second conveyor line 102 for processing. Once all of the items to be processed are transferred, the second conveyor line 102 continues along the first conveyor line 101 for workers to place the processed items, or to catch any scraps or misplaced items which fall from the first conveyor line 101 during processing. A third conveyor line 109 can be installed to place parts of the processed items. The first conveyor line 101 is operated via a motor 103, the second conveyor line 102 operated via a motor 104, and the third conveyor line via a motor 110. These motors may be configured to operate at matching speeds, or they can be operated with variable frequency drives such that the movement speed differs between the first conveyor line 101, the second conveyor line 102, and the third conveyor line 109. The polarity of the first conveyor line motor 103, the second conveyor line motor 104, and the third conveyor line motor 110 could also be reversed such that the first conveyor line 101 and second conveyor line 102 run the opposite direction of the third conveyor line 109, or any combination of opposing conveyor directions.

Figure 2:
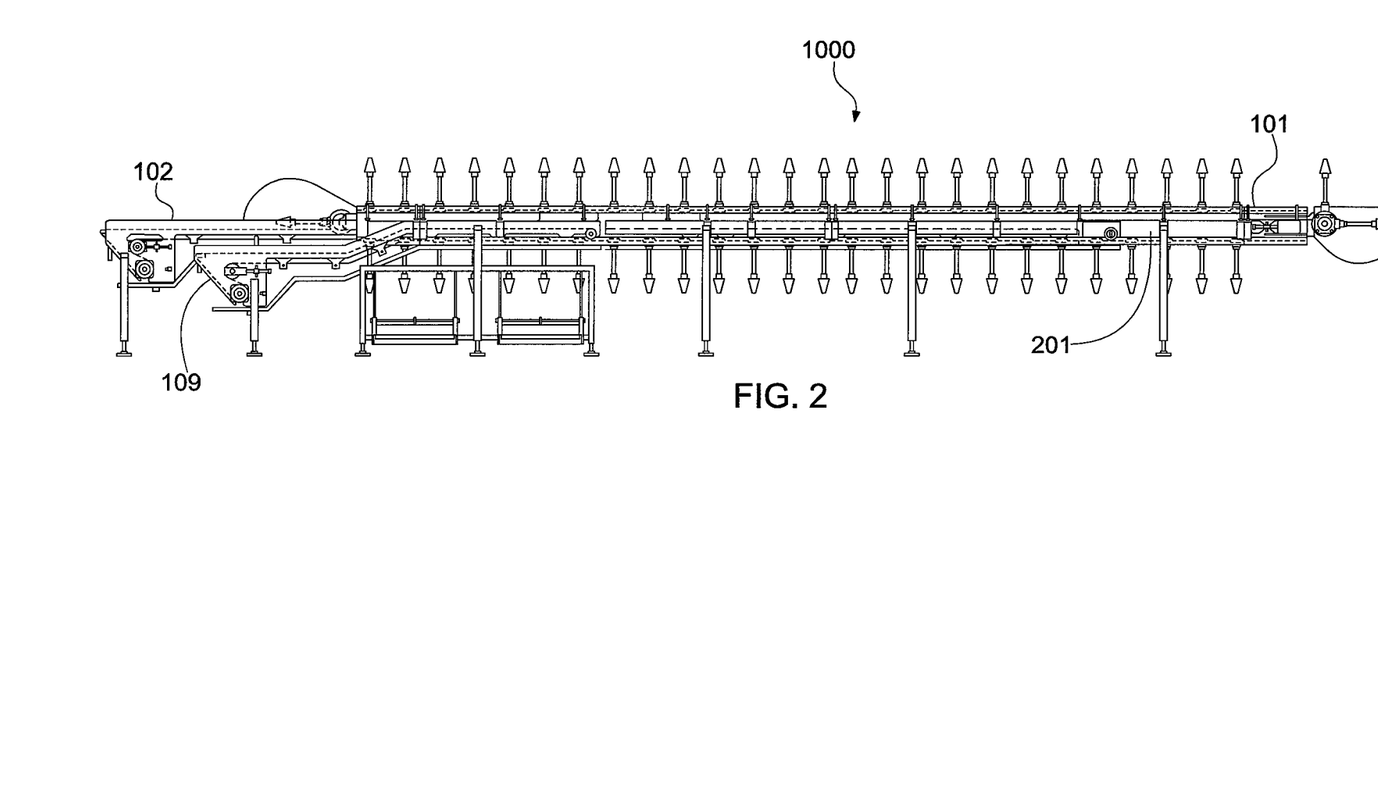
FIG. 2 is a perspective view of the conveyor system.
Figure 8:
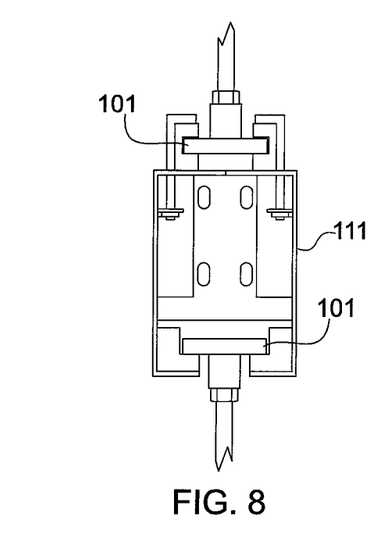
FIG. 8 is a cross-sectional view of the first conveyor line.

At least two conveyor lines 101 and 102 are placed on a single frame 201, as illustrated in FIG. 2. The frame 201 is a single unit built from a prefabricated open conveyor frame. While the frame could be fabricated in a single piece, a preferred embodiment is to fabricate the frame in parts, such as 20 foot sections, and bolt the sections together on site. The single frame 201 allows for smaller tolerances than the traditional method of constructing different conveyor belt frames through metal tubing. For example, in FIG. 1, the first conveyor 101 and second conveyor 102 share a common sidewall 111. FIG. 8 illustrates this construction, where the first conveyor line 101 is built with a 3/16 inch plate as the sidewall 111, and no metal tubing is present. The framing of the conveyor lines could be metal plates of varying thickness, or any other construction material that provides structural support.

Figure 3:
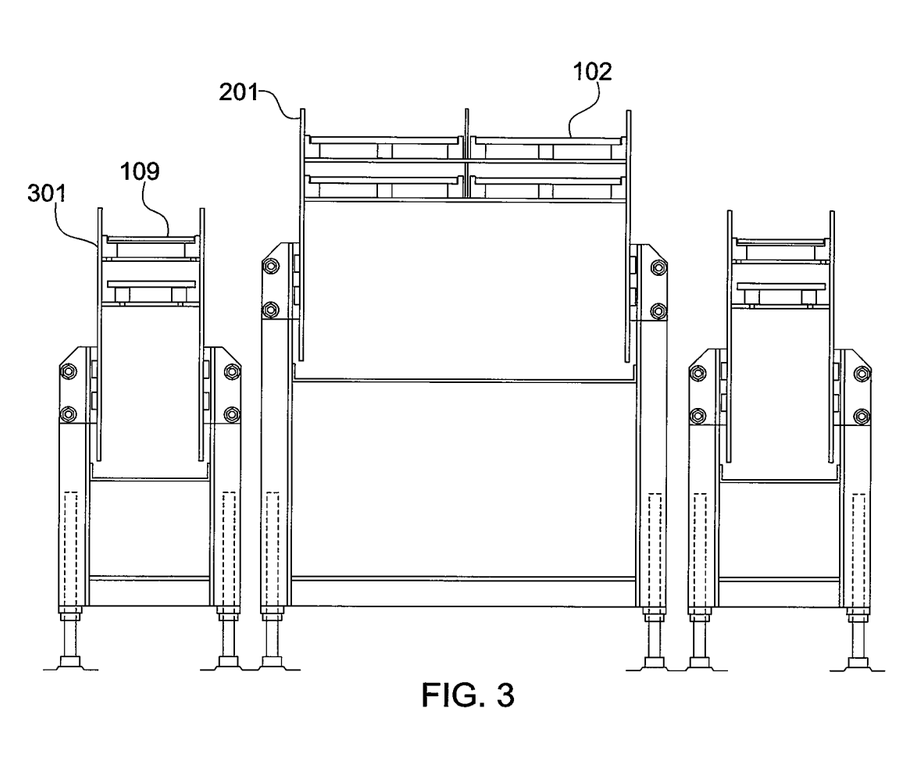
FIG. 3 is a cross-sectional view along lines AA of FIG. 1.

While tubing could be used in parts of the conveyor frame 201, the preferred embodiment is to use no metal tubing, such that the conveyor lines are supported and/or enclosed in an open conveyor frame 201. If necessity requires, tubing can be used throughout the system, and may be used for ancillary support parts such as support legs or braces, but the use of tubing in the preferred embodiment, particularly in the conveyor frame 201, is kept to a minimum. Additionally, as seen in FIG. 3, it may be desirable to place one or more conveyors on their own frame, such as placing the third conveyor line 109 on a secondary conveyor frame 301, separate from the frame 201. Like the frame 201, the preferred embodiment is to build the secondary conveyor frame 301 without tubing.

Figure 9:
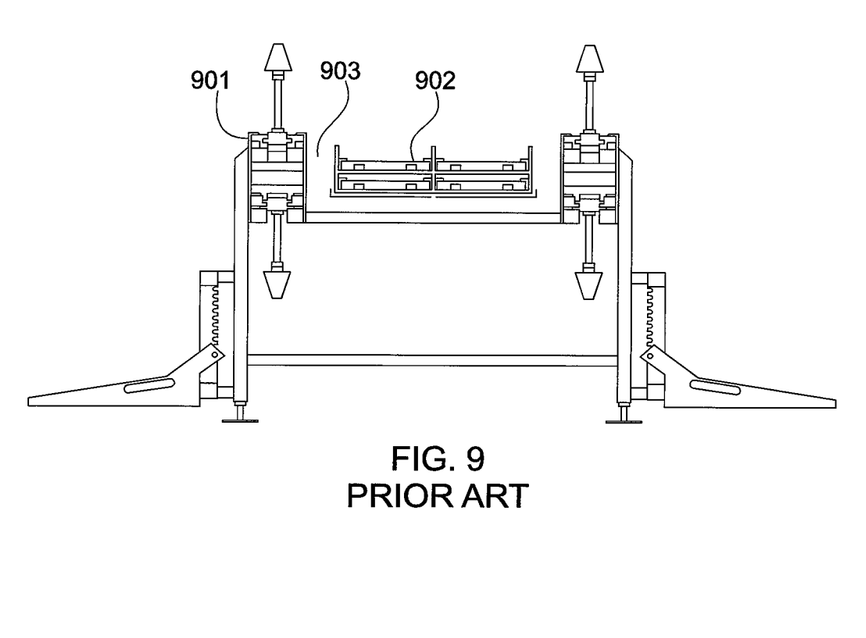
FIG. 9 is the prior art arrangement of the first and second conveyor line.

Referring back to FIG. 1, by building a single frame 201 and a shared sidewall 111, any gap between the first conveyor line 101 and second conveyor line 102 is eliminated. In the prior art, such a gap could be as large as 3.5 inches. This can present significant issues because it would require workers to reach an extra 3.5 inches to cross the gap, and it increases the chances of items falling through the gaps and becoming contaminated or discarded. The prior art arrangement can be seen in FIG. 9, where a gap 903 exists between the prior art first conveyor line 901 and prior art second conveyor line 902. Eliminating this gap 903 is even more beneficial as the conveyor system becomes larger. For example, referring back to FIG. 1, while the preferred embodiment is a first conveyor line 101 and a second conveyor line 102, any number of conveyor lines could be used. If five conveyor lines were used, each with a 3.5 inch gap, it would result in 17.5 inches of lost space.

The single frame, with the smaller tolerances, also removes many of the gaps, crevices, and small spaces which were present in the prior art. Such small spaces can be difficult to clean and keep sterile, increasing the amount of time spent to clean the machinery and increasing the chances of contaminating the items to be processed.

Figure 5:
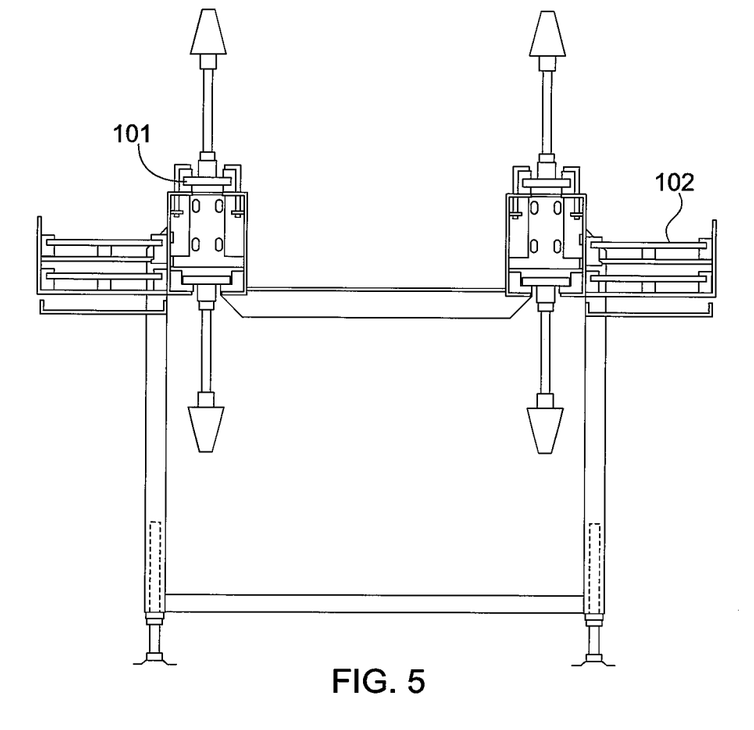
FIG. 5 is a cross-sectional view along lines YY of FIG. 1.
Figure 7:
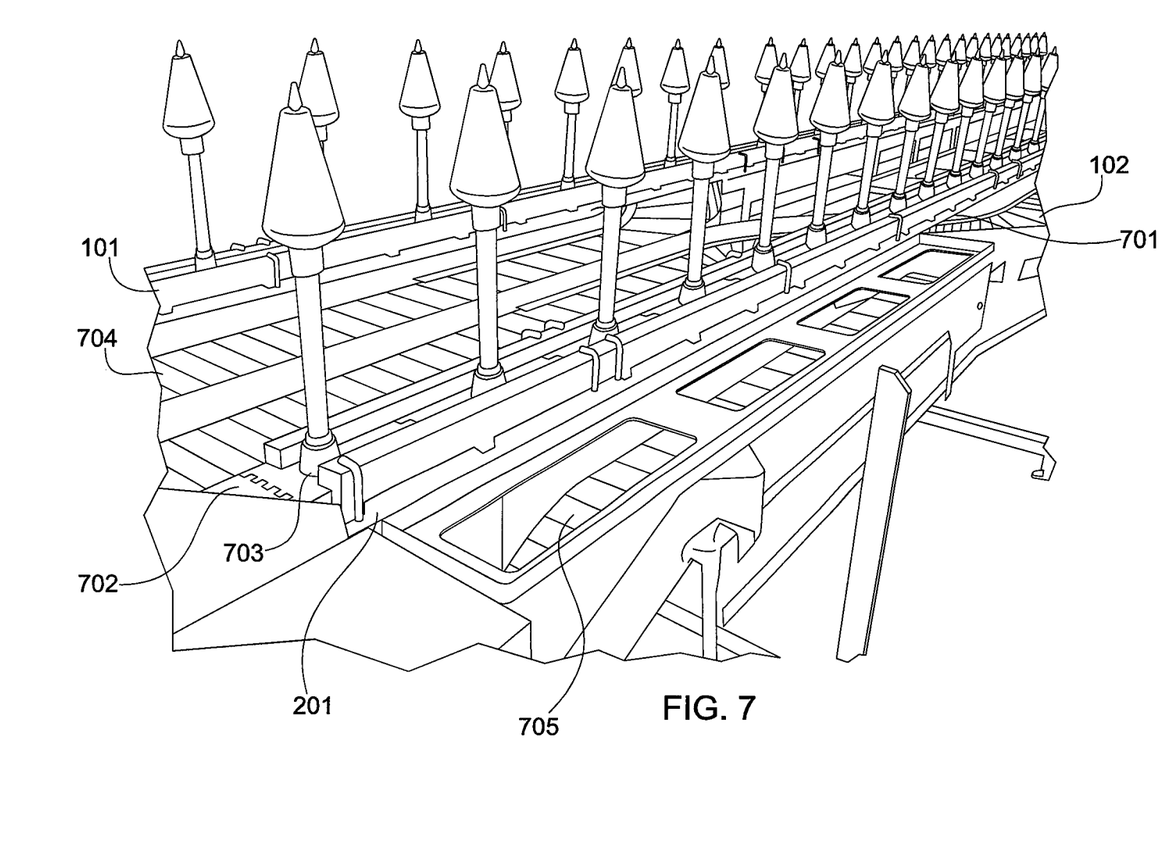
FIG. 7 is a picture view of the first and second conveyor.

In a further embodiment, the second conveyor line 102 crosses under the first conveyor line 101, as seen in FIG. 1. This can also be appreciated in FIG. 3 and FIG. 5, which are the outermost cross sections of the conveyor system 1000. In FIG. 3, the second conveyor line 102 is shown after it has merged into side-by-side belts. In FIG. 5, the first conveyor line 101 is shown inside the second conveyor line 102. This is a further advantage of placing the conveyor lines 101 and 102 on a single frame because it allows the user to design the conveyor lines 101 and 102 to pass through an aperture in a plate and cross through the frame 201 without having to create a gap or break in the frame 201 itself. FIG. 7 illustrates this type of construction, where the second conveyor line 102 flows underneath the first conveyor line 101 through an aperture 701 in the frame 201.

This inner versus outer spatial relationship between the first conveyor line 101 and second conveyor line 102 can be configured according to the exact process at issue. In some processes, it may be ideal to run the second conveyor line 102 on the outside of the first conveyor line 101 for its entire distance, or, alternatively, to run the second conveyor line 102 on the inside of the first conveyor line 101 for the entire distance.

Referring back to FIG. 1, depending on the item to be processed, it may be necessary to modify the first conveyor line 101 to have item holding arrangements 105. With such item holding arrangements 105, workers could more easily place an item on the first conveyor line 101, and make it easier for workers to access the item being processed. As an illustrative example, the item holding arrangement could include an upright member 106 and cone 107. Such a configuration is ideal for processing items such as chickens, which would be placed on the cones 107 so workers downstream could make cuts to the chickens in order to remove meat from the bones or separate the different cuts of meat. In a preferred embodiment, the cone is made of a solid material, such as a plastic or metal, to prevent bacteria from entering and contaminating the process. While a cone 107 is ideal for chicken processing, other types of holding arrangements could be used for other items, such as hooks, straps, rods, etc.

In another embodiment, the upright members 106 could contain various T joints and 90 degree elbows to create a branching effect, whereby a single upright member 106 could contain multiple cones 107.

Continuing with the chicken processing example, the chicken enters the conveyor system 1000 on the second conveyor line 102 on the first end 112, while the three conveyor lines 101, 102, 109 move in direction A. In the placement area 113, a worker moves the chicken from the second conveyor line 102 and places the chicken on the first conveyor line 101, preferably on a cone 107 supported by an upright member 106. The chicken would move in direction A to the deboning area 114 where workers separate the meat from the bones using sharp knives. The breast meat is placed back on the second conveyor line 102 and the tenders, the balance of the meat, is placed on the third conveyor line 109.

While the conveyor lines 101, 102, 109 could be made of a variety of materials, if an item holding arrangement 105 is used, it is ideal to adapt the first conveyor line 101 materials of construction to keep the item holding arrangement 105 secure. As best seen in FIG. 7, in a preferred, but not limiting embodiment, the first conveyor line 101 is made of interlinking thermoplastic plates 702, 703, where some of the plates 703 are configured to receive the item holding arrangement 105. The specially configured plates 703 can threadably engage with the item holding arrangement 105. The first conveyor line can be built such that every interlinked plate contains the threaded adaptation, or such that every other, every third, etc. can receive the holding arrangement 105. While a threaded connection is the preferred embodiment, other methods of attachment, such as bolts or clamps, can also be used. The tighter the linkage between the plates, the less likely product or bacteria can enter the space between the plates, and the preferred embodiment is the least possible space between the plates such that the first conveyor line 101 forms an essentially solid surface. Additionally, while a solid conveyor line is the preferred embodiment, the first conveyor line 101 could also be a metal or thermoplastic knuckle chain.

FIG. 7 also shows various other materials of construction possible in the conveyor system. For example, the conveyor lines 101, 102, 109 could be made of a plurality of plastic, rubber, or metal links, as seen in the second conveyor line belt 704. The conveyor could also be made of interlocking plastic, metal, or rubber plates as seen in the third conveyor line belt 705. It can be appreciated that the conveyor belts can be any number of suitable materials depending on the configuration of the conveyor lines 101, 102, 109, and the materials being transported.

Referring back to FIG. 1, the use of varying materials of construction may affect the type of rotational mechanism 115 used. In the preferred embodiment, where interlocking plates are used, the rotational mechanism 115 may be a sprocket. The rotational mechanism 115 may also be any sort of roller or bearing capable of moving the conveyors along their desired path.

In another embodiment, the conveyor system 1000 includes standing platforms 108 for workers to stand while working on the assembly line. The standing platforms 108 allow for workers to access the first conveyor line 101 without having to reach as high, which can improve workplace ergonomics, thereby reducing fatigue and decreasing the chances of workers making mistakes while working. This is particularly advantageous in industries where workers utilize sharp or dangerous tools when working the conveyor system 1000. The standing platform 108 may be solid in construction, being made of a material such as thermoplastic or metal. The platform can also be a grate, which would allow small matter to fall through the grates and reduce the chances of the worker slipping.

Figure 4:
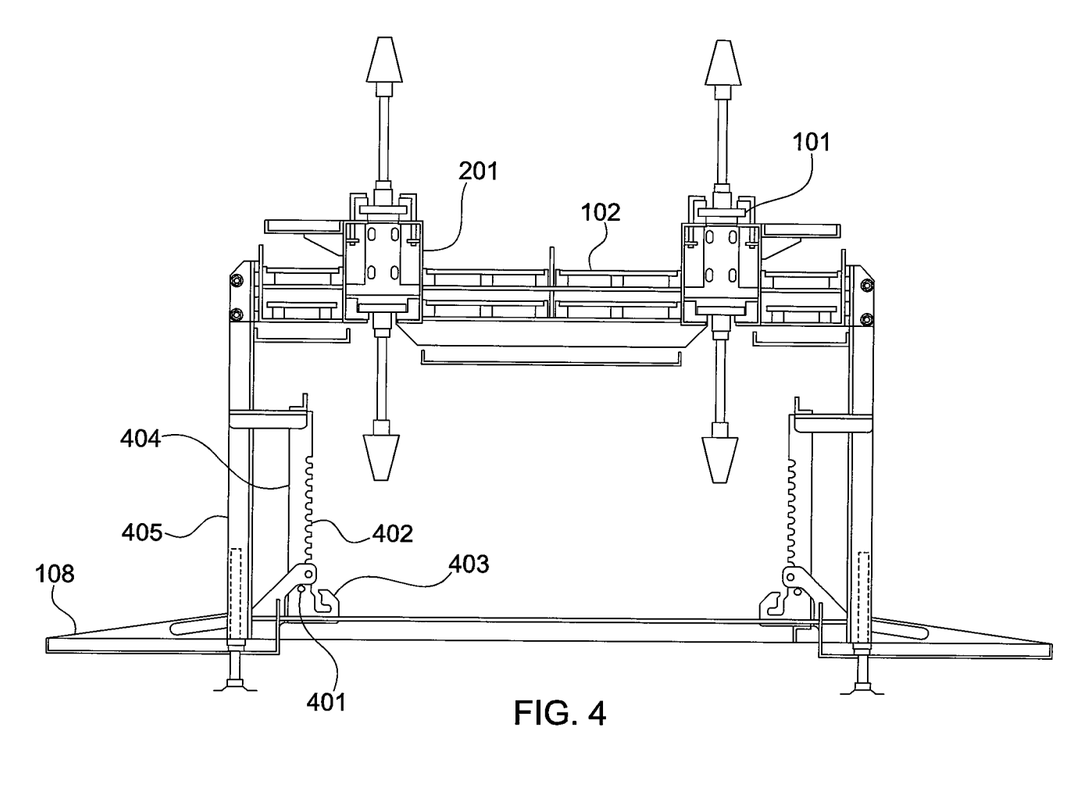
FIG. 4 is a cross-sectional view along lines BB of FIG. 1.

Referring now to FIG. 4, in another preferred but non-limiting embodiment, the standing platforms 108, as described above, can be moveable to accommodate workers of varying heights. The simplest configuration is one where the standing platform contains a bracket 403 which contains a rod 401 which rests in the notch 402 of a plate 404 attached to the support member 405 to secure the standing platform 108. So long as the rod 401 is higher than the standing platform 108, the weight of the standing platform will secure the rod 401 into the notch 402 and prevent it from slipping. While not necessary, it may be desirable to construct the standing platform 108 of a lightweight material, such as a strong plastic, so that the standing platform 108 can be picked up and adjusted by a worker without special equipment. However, other methods of raising or lowering the platform are available. The platform could be raised or lowered using electrical and mechanical machinery such as a hydraulic lift underneath the platform, or a rack and pinion whereby the rack replaces the notches 402 and the pinion replaces the rod 401. Use of electronic and hydraulic lifts may be more desirable for platforms made of heavier materials.

By using a rod 401 and notch 402 construction, the platform could be moved not only up and down, but across the conveyor system as well. If the conveyor system has multiple plates with notches 402, the platform could be removed completely and placed at another point in the assembly line. Being able to remove the standing platform 108 also assists in cleaning and replacing broken standing platforms 108. The rod 401 and notch 402 construction also allows for the platform to be easily swiveled up and secured against the support member 405 during a cleaning to more easily clean the underside of the standing platform 108 and the floor beneath it.

Figure 6:
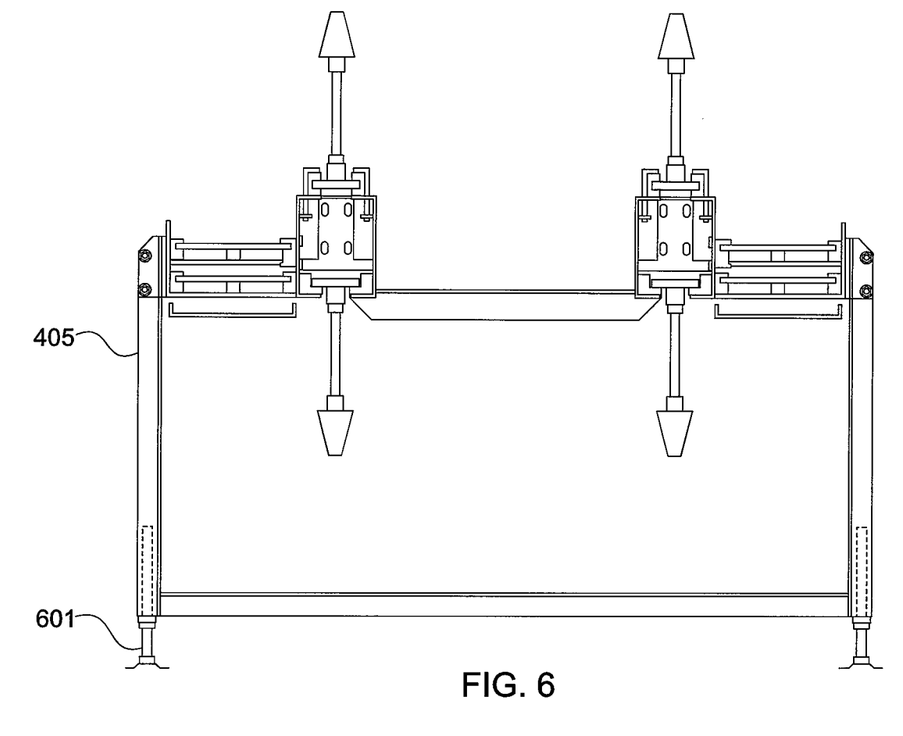
FIG. 6 is a cross-sectional view along lines ZZ of FIG. 1.

Referring now to FIG. 6, the support members 405 may be placed on adjustable feet 601 to allow for a level installation of the conveyor system on uneven or imperfect surfaces. Various methods can be used to secure the feet in position, the most preferable being a collar or band around the feet 601 which can be tightened to prevent the support member 405 from sliding down the feet 601.

Figure 10:
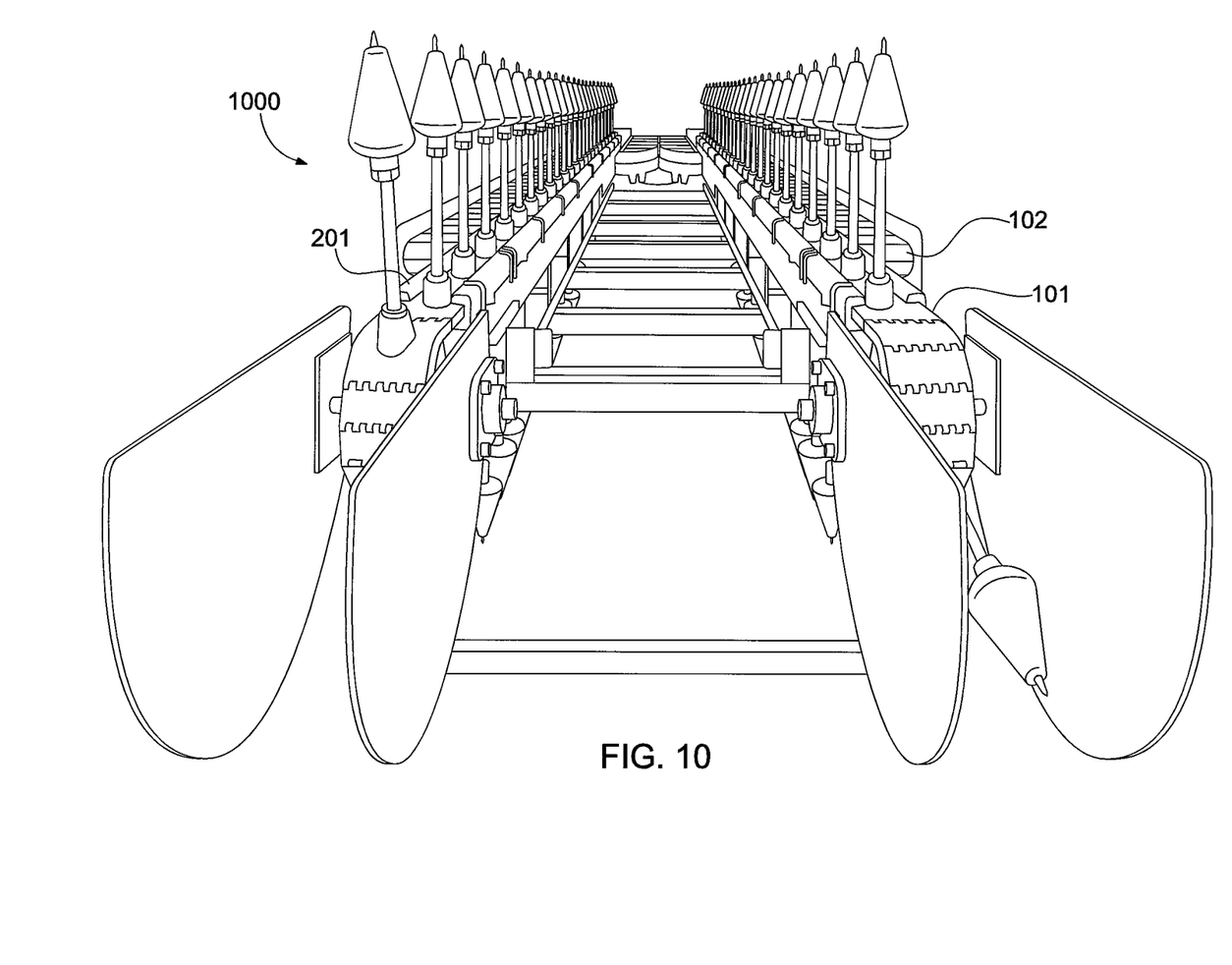
FIG. 10 is a perspective view of the conveyor system.
Figure 11:
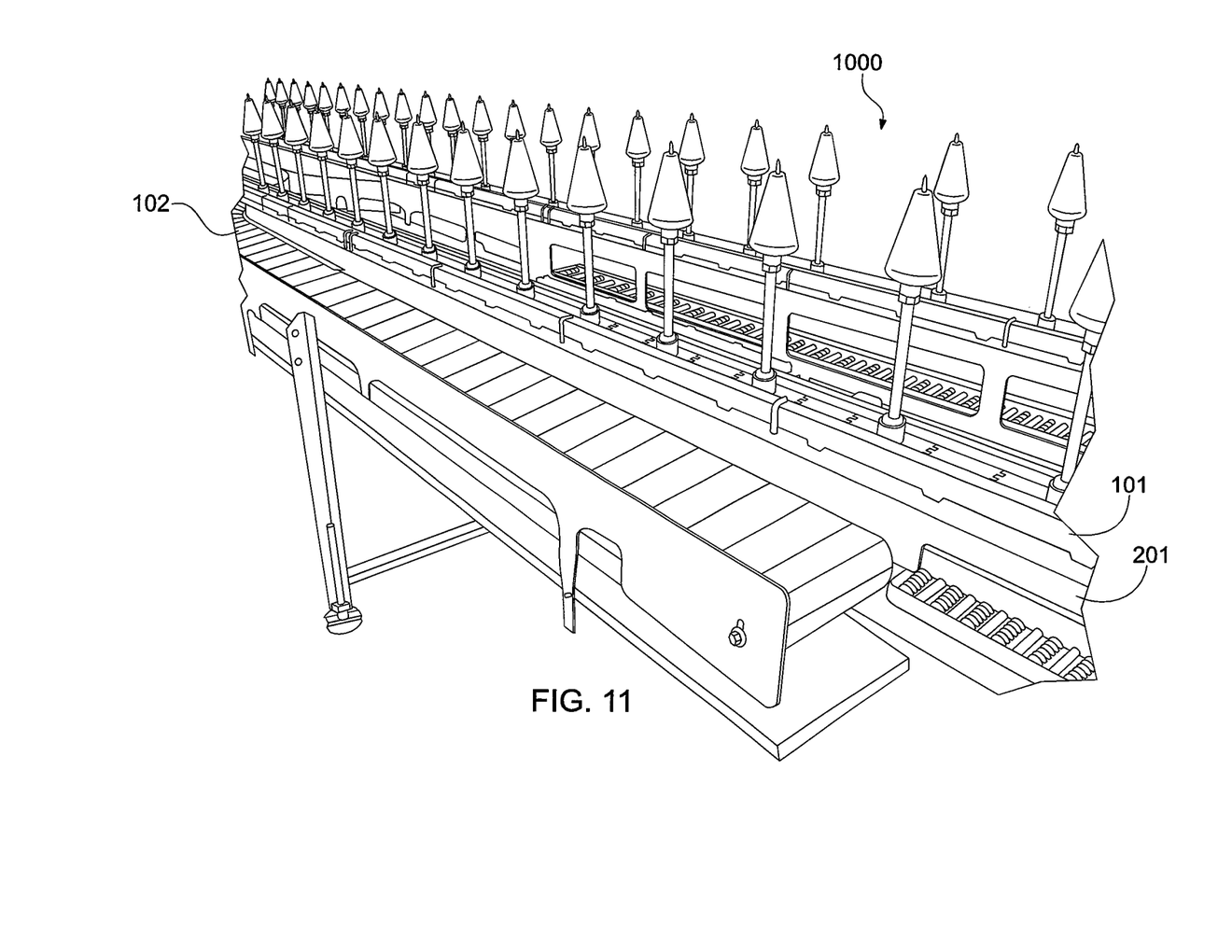
FIG. 11 is a perspective view of the conveyor system.
Figure 12:
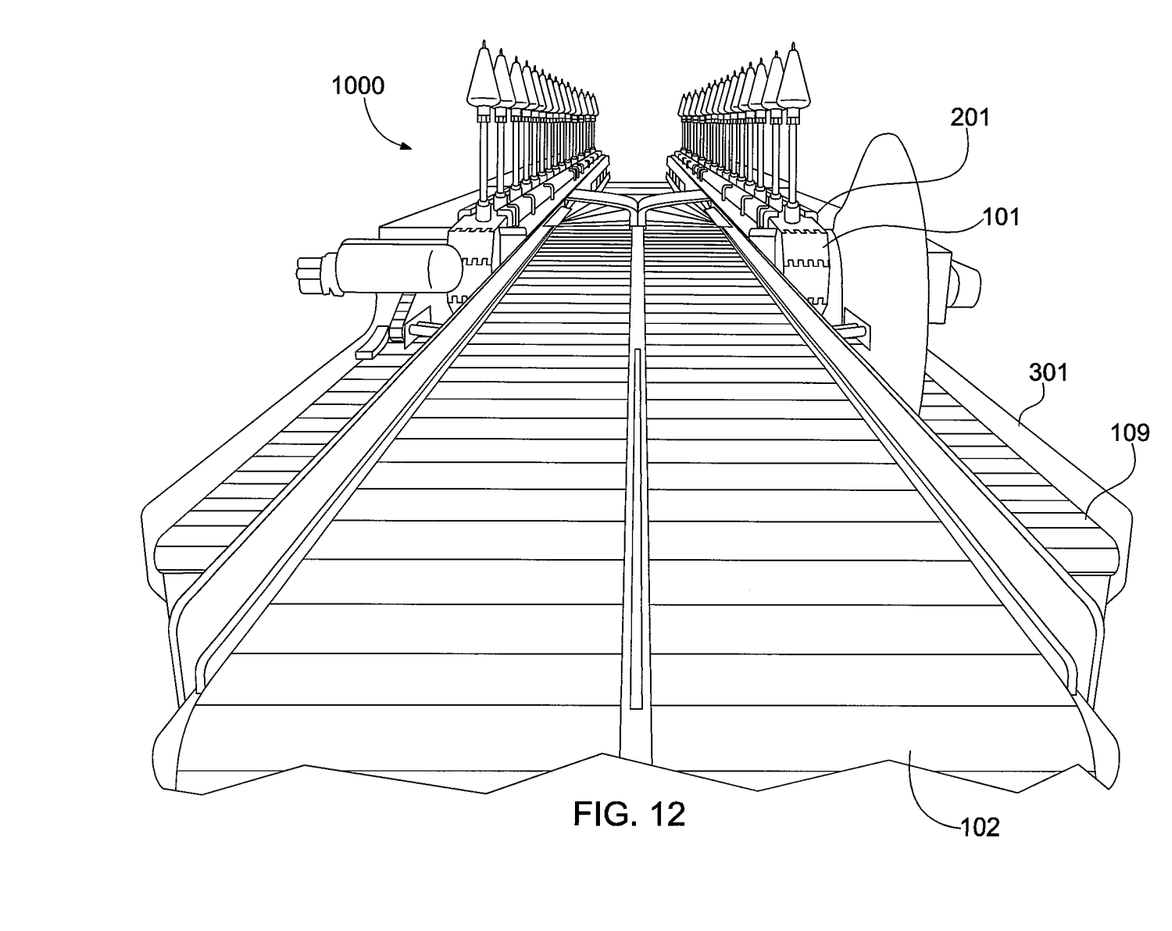
FIG. 12 is a perspective view of the conveyor system.
Figure 13:
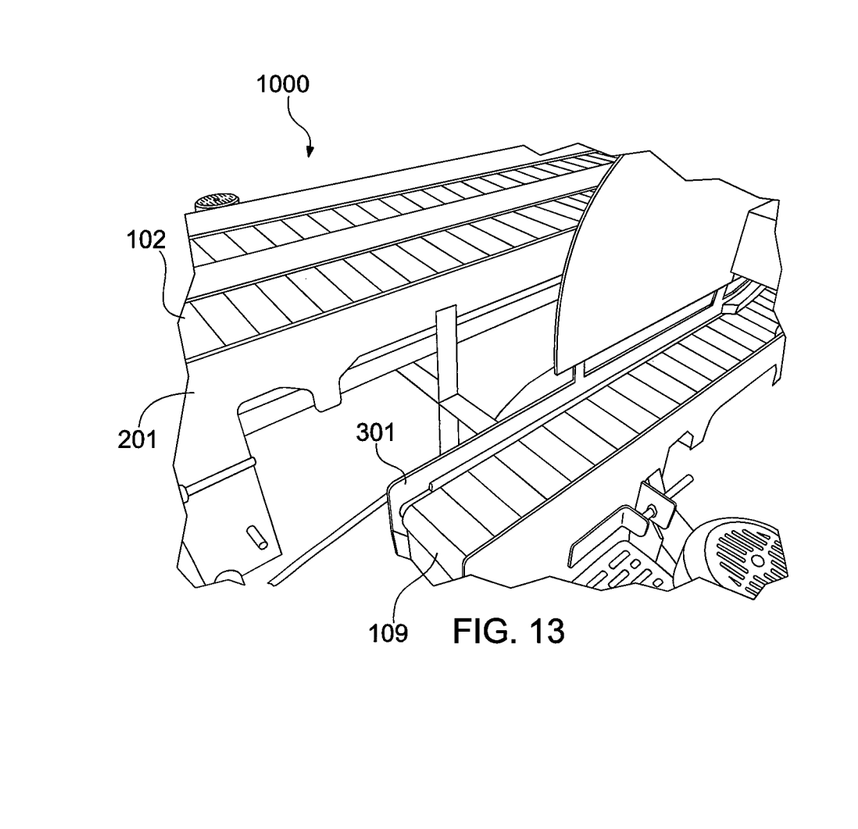
FIG. 13 is a perspective view of the conveyor system.
Figure 14:
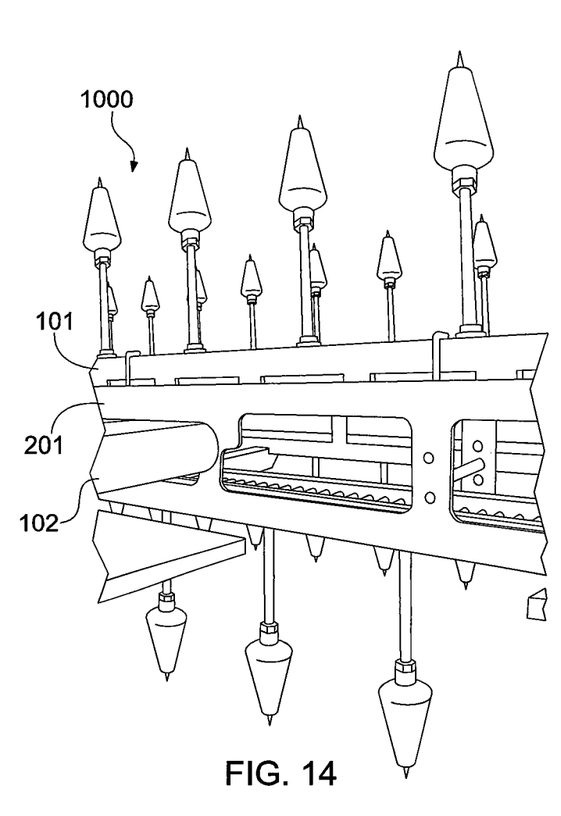
FIG. 14 is a perspective view of the conveyor system.
Figure 15:
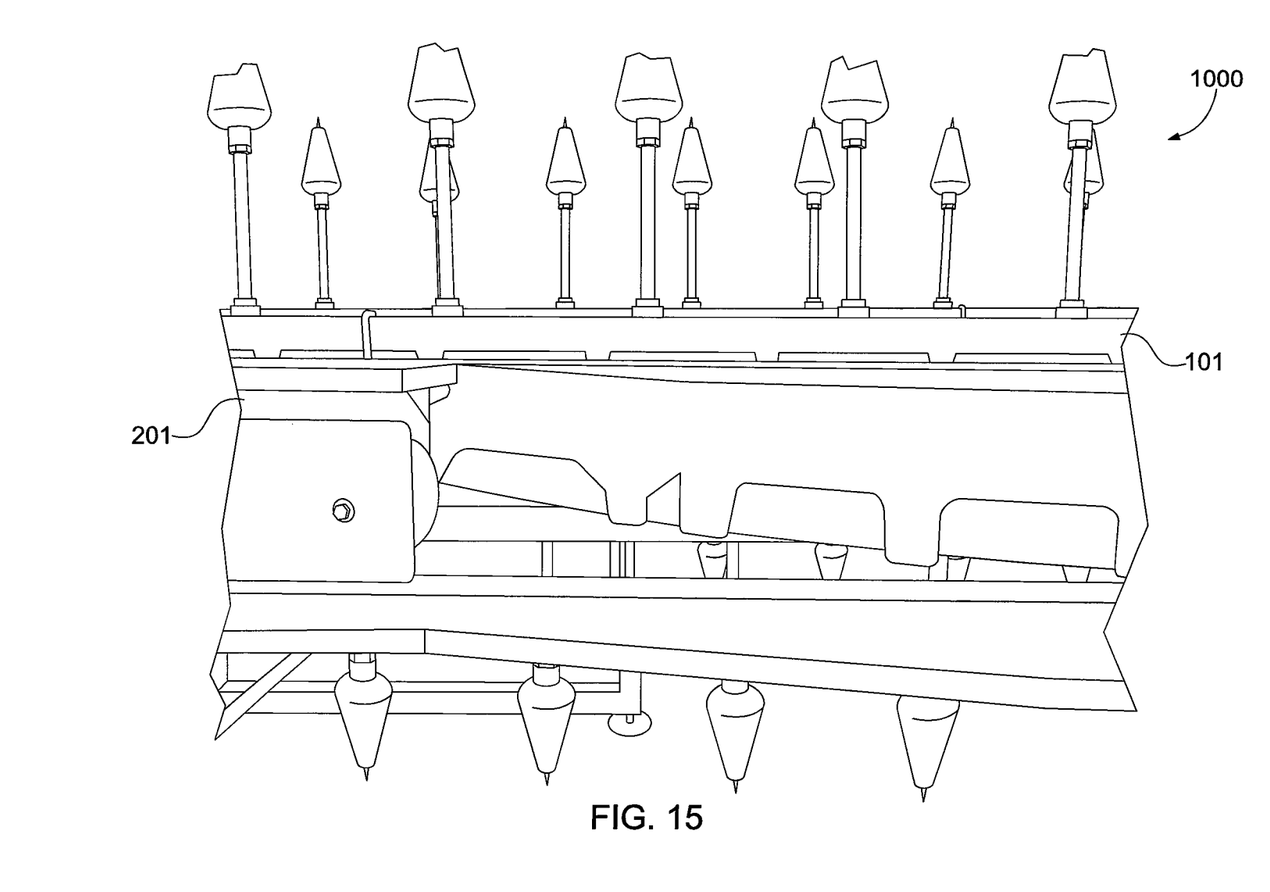
FIG. 15 is a perspective view of the conveyor system.

FIG. 10, FIG. 11, FIG. 12, FIG. 13, FIG. 14, and FIG. 15 are perspective views of the conveyor system 1000. FIG. 10 and FIG. 11 show the first conveyor line 101, the second conveyor line 102, and the conveyor frame 201 in the preferred embodiment, which is without any tubing. FIG. 12 also shows the third conveyor line 109 and secondary frame 301. FIG. 13 is an end view of the conveyor system 1000 showing the second conveyor line 102, the frame 201, the third conveyor line 109, and the secondary frame 301. FIG. 14 and FIG. 15 show side views of the conveyor system 1000, the first conveyor line 101, the second conveyor line 102, and the frame 201.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A conveyor system comprising:
   a frame;
   a first conveyor line adapted for securing poultry and supported by the frame;
   a second conveyor line supported by the frame and positioned directly adjacent to the first conveyor line such that the first and second conveyors share a common sidewall;
   a third conveyor line adapted for securing poultry and supported by the frame; and
   a fourth conveyor line supported by the frame and positioned directly adjacent to the third conveyor line such that the third and fourth conveyor lines share a common sidewall,
   wherein at least a portion of the third and fourth conveyor lines are separated from at least a portion of the first and second conveyor lines by an open gap.

2. The conveyor system of claim 1, wherein the first conveyor line comprises at least one upright member having a first end connected to the first conveyor line and a second end opposite the first end, the upright member being adapted for securing poultry.

3. The conveyor system of claim 2, wherein the first conveyor line is made of a plurality of connectible plates, wherein at least one of the connectible plates is adapted to threadably engage with the first end of the at least one upright member.

4. The conveyor system of claim 1, wherein the second conveyor line comprises an endless belt made of a plurality of plastic links.

5. The conveyor system of claim 1, wherein the second conveyor line passes through an aperture in a plate in the frame and traverses the first conveyor line underneath the first conveyor line.

6. The conveyor system of claim 1, wherein the frame comprises a plurality of modular sections which can be connected to build the frame.

7. The conveyor system of claim 1, wherein the first conveyor line and the second conveyor line abut one another so no gaps are formed therebetween.

8. The conveyor system of claim 1, wherein the second conveyor line crosses under the first conveyor line.

9. The conveyor system of claim 1, wherein the first conveyor line is positioned at an inside position relative to the second conveyor line.

10. A conveyor system comprising:
    a frame having a lower portion and an upper portion, whereby the upper portion and lower portion are separated by a midline;
    at least one standing platform connected to the lower portion of the frame;
    a first conveyor line adapted for securing poultry and supported by the frame;
    a second conveyor line supported by the frame and positioned directly adjacent to the first conveyor line;
    a third conveyor line adapted for securing poultry and supported by the frame; and
    a fourth conveyor line supported by the frame and positioned directly adjacent to the third conveyor line,
    wherein at least a portion of the third and fourth conveyor lines are separated from at least a portion of the first and second conveyor lines by an open gap.

11. The conveyor system of claim 10, wherein the at least one standing platform can be raised or lowered.

12. The conveyor system of claim 11, wherein the at least one standing platform can be raised or lowered by fitting the at least one standing portion with a bracket containing a rod, wherein the rod is capable of mating with at least one notch in at least one plate attached to the frame.

13. A conveyor system comprising:
    a frame;
    a first conveyor line supported by the frame;
    a second conveyor line supported by the frame and positioned directly adjacent to the first conveyor line;
    a third conveyor line supported by the frame; and
    a fourth conveyor line supported by the frame and positioned directly adjacent to the third conveyor line,
    wherein at least a portion of the third and fourth conveyor lines are separated from at least a portion of the first and second conveyor lines by an open gap;
    wherein at least one of the conveyor lines is adapted for securing poultry; and
    wherein at least two of the conveyor lines share a common sidewall.

14. The conveyor system of claim 13, wherein the plurality of conveyor lines comprises at least two conveyor lines of varying lengths.

15. The conveyor system of claim 13, wherein at least one conveyor line passes through the frame and underneath at least another conveyor line.

16. The conveyor system of claim 13, wherein the frame comprises a plurality of modular sections which can be connected to build the frame.

17. The conveyor system of claim 13 further comprising an additional conveyor line built on a secondary frame.

18. A method for using a conveyor system which comprises the following steps:

operating a first conveyor line and a second conveyor line simultaneously, wherein the first conveyor line and second conveyor line share a common sidewall;
operating a third conveyor line and a fourth conveyor line simultaneously, wherein the third conveyor line and fourth conveyor line share a common sidewall;
placing poultry on at least one of the first conveyor line and third conveyor line; and
processing the poultry according to a manufacturing process,
wherein at least a portion of the third and fourth conveyor lines are separated from at least a portion of the first and second conveyor lines by an open gap.

* * * * *